(12) United States Patent
Shimada

(10) Patent No.: US 7,221,465 B1
(45) Date of Patent: May 22, 2007

(54) PRINTER CONTROL DEVICE AND METHOD TO CONTROL PRINTERS IN NETWORK TO WHICH MULTIPLE PRINTERS ARE CONNECTED, AND COMPUTER PROGRAM PRODUCT TO PERFORM SAID CONTROL

(75) Inventor: Hirokatsu Shimada, Machida (JP)

(73) Assignee: Minolta Co., Ltd., Osaka (JP)

( * ) Notice: Subject to any disclaimer, the term of this patent is extended or adjusted under 35 U.S.C. 154(b) by 744 days.

(21) Appl. No.: 09/586,641

(22) Filed: Jun. 5, 2000

(30) Foreign Application Priority Data

Jun. 11, 1999 (JP) .................................. 11-165557

(51) Int. Cl.
*G06F 15/00* (2006.01)
*G06K 1/00* (2006.01)

(52) U.S. Cl. ...................................... 358/1.14; 358/1.9
(58) Field of Classification Search ................. 358/1.1, 358/1.11–1.18, 1.9, 407, 468, 438
See application file for complete search history.

(56) References Cited

U.S. PATENT DOCUMENTS

| | | | | |
|---|---|---|---|---|
| 5,689,350 | A * | 11/1997 | Rolleston | 358/504 |
| 5,764,807 | A * | 6/1998 | Pearlman et al. | 382/240 |
| 5,835,243 | A * | 11/1998 | Mori | 358/518 |
| 5,982,983 | A * | 11/1999 | Ito et al. | 386/121 |
| 6,108,008 | A * | 8/2000 | Ohta | 345/590 |
| 6,404,509 | B1 * | 6/2002 | Kuwata et al. | 358/1.9 |
| 6,424,425 | B1 * | 7/2002 | Otsuka | 358/1.15 |
| 6,441,918 | B1 * | 8/2002 | Hori | 358/1.16 |
| 6,473,197 | B1 * | 10/2002 | Shimazaki | 358/1.9 |
| 6,552,813 | B2 * | 4/2003 | Yacoub | 358/1.1 |
| 6,744,531 | B1 * | 6/2004 | Mestha et al. | 358/1.9 |
| 6,825,952 | B1 * | 11/2004 | Lee et al. | 358/1.9 |

FOREIGN PATENT DOCUMENTS

| | | |
|---|---|---|
| JP | 06-105131 A | 4/1994 |
| JP | 06-303432 A | 10/1994 |
| JP | 7-95427 A | 4/1995 |
| JP | 7-152521 A | 6/1995 |
| JP | 07-225660 A | 8/1995 |
| JP | 08-185290 A | 7/1996 |
| JP | 9-200544 A | 7/1997 |
| JP | 10-011242 A | 1/1998 |
| JP | 10-75373 A | 3/1998 |
| JP | 10301737 A * | 11/1998 |
| JP | 410301737 A * | 11/1998 |
| JP | 11-305970 A | 11/1999 |
| JP | 2000-270130 A | 9/2000 |

* cited by examiner

*Primary Examiner*—David Moore
*Assistant Examiner*—Thierry L. Pham
(74) *Attorney, Agent, or Firm*—Sidley Austin LLP

(57) ABSTRACT

In a network system which includes multiple printers, when a problem is detected in any one of the printers performing a print, another normally functioning printer is selected to substitute for the printer in which the problem is detected. In order to ensure that quality of the images printed by the selected substitute printer is the same as that of the images printed by the printer in which the problem is detected, the print data is corrected and is outputted to the selected substitute printer.

27 Claims, 4 Drawing Sheets

| Y | M | C | K | L* | a* | b* |
|---|---|---|---|----|----|----|
| 0 | 0 | 0 | 0 | 90 | 2 | 3 |
| 0 | 10 | 0 | 0 | 80 | 4 | 4 |
| | ┊ | | | | ┊ | |
| 0 | 100 | 0 | 0 | 40 | 50 | -10 |

PRINTER CONTROL DEVICE AND METHOD TO CONTROL PRINTERS IN NETWORK TO WHICH MULTIPLE PRINTERS ARE CONNECTED, AND COMPUTER PROGRAM PRODUCT TO PERFORM SAID CONTROL

This application is based on application No. 11-165557 filed in Japan, the contents of which is hereby incorporated by reference.

BACKGROUND OF THE INVENTION

1. Field of the Invention

The present invention pertains to a printer control device and method to control printers in a network to which multiple printers are connected, and a computer program product to perform this control, and more particularly, to a printer control device and method by which, where printing is continued using a substitute printer to substitute for a printer that has failed, the same image quality, including such aspects as color characteristics and gradation characteristics, is ensured in the output from both printers.

2. Description of the Related Art

Printer systems in which multiple printers are connected to each other by means of a network circuit are conventionally available. Using such a printing system, one of the multiple printers is selected so that printing will be executed using this selected printer. In addition, when a problem has occurs in the printer that is performing printing in the printing system, the images that are not printed by the failed printer are output by another printer (see Japanese Laid-Open patent Application No. Hei 10-11242).

There are differences in the output characteristics of the multiple printers, however, because they are made by different manufacturers, or due to aging. Consequently, in the case of color images, the color characteristics of the images printed by the first selected printer before the failure occurred does not match the color characteristics of the images printed by a substitute printer after the failure occurred, resulting in the problem that the color characteristics of the printed images are different.

In the case of monochrome images, the gradation characteristics of the images printed using the selected printer and the gradation characteristics of the images printed using a substitute printer are different, resulting in the problem that there is a difference in darkness between the two sets of printed images.

OBJECT AND SUMMARY

The object of the present invention is to provide an improved printer control device and method and a computer program product for this control.

Another object of the present invention is to provide (i) a printer control device and method to control a network system, such that where a failure occurs in a printer performing printing in a network circuit to which multiple printers are connected, printing is continued using a substitute printer, and (ii) a computer program product for this control.

Another object of the present invention is to provide (i) a printer control device and method, such that where a failure occurs in a printer performing printing in a network circuit to which multiple printers are connected, printing is continued using a substitute printer in a manner that ensures that the color or gradation characteristics of the images printed by the substitute printer after the failure are not different from the color or gradation characteristics of the images printed by the printer in which the failure occurred before the occurrence of the failure, and (ii) a computer program product for this control.

In order to attain these and other objects, one aspect of the present invention comprises a printer control device that controls multiple printers connected to a network circuit, said printer control device having (i) a detector that detects a problem in any of the printers, (ii) selection control in which, when a problem is detected by the detector, another normally functioning printer is selected to substitute for the printer in which the problem was detected, and (iii) substitution control in which (a) correction is made to the print data that was to have been printed out by the printer in which the problem occurred, to ensure that the quality of the images printed by the selected substitute printer is the same as that of the images printed by the printer in which the problem occurred, and (b) the corrected print data is output to the selected substitute printer.

Another aspect of the present invention comprises the printer control device described above, wherein the print data includes color print data that indicates color images, and the substitution control performs correction so that the color characteristics of the color images printed by the printer in which the problem occurred are the same as those of the color images printed by the selected substitute printer.

Another aspect of the present invention comprises the printer control device described above, wherein the print data includes halftone print data that indicates halftone images, and the substitution control performs correction so that the gradation characteristics of the halftone images printed by the printer in which the problem occurred are the same as the gradation characteristics of the halftone images printed by the selected substitute printer.

Another aspect of the present invention comprises the printer control device described above, wherein when the detector detects a problem in the printer performing a print job, the substitution control outputs to the selected substitute printer the print data for the remaining pages not printed by the printer in which the problem was detected.

In order to attain these and other objects, one aspect of the present invention comprises a printer control method to control multiple printers connected to a network circuit, said printer control method having a detection step in which the occurrence of a problem in any of the printers is detected, a selection step in which another normally functioning printer is selected to substitute for the printer in which the problem was detected, and a substitution step in which correction is made to ensure that the quality of the images printed by the selected substitute printer matches the quality of the images printed by the printer in which the problem occurred, and the corrected print data is output to the selected substitute printer.

In order to attain these and other objects, one aspect of the present invention comprises a computer program product to control multiple printers connected to a network circuit, said computer program product (i) having detection control in which the occurrence of a problem in any of the printers is detected, (ii) selection control in which another normally functioning printer is selected to substitute for the printer in which the problem was detected, and (iii) substitution control in which correction is performed to ensure that the quality of the images printed by the selected substitute printer matches the quality of the images printed by the printer in which the problem occurred, and the corrected print data is output to the selected substitute printer.

BRIEF DESCRIPTION OF THE DRAWINGS

These and other objects and features of the present invention will become apparent from the following description of a preferred embodiment thereof taken in conjunction with the accompanying drawings, in which.

In the following description, like parts are designated by like reference numbers throughout the several drawings.

DETAILED DESCRIPTION OF THE PREFERRED EMBODIMENTS

Figure 1:
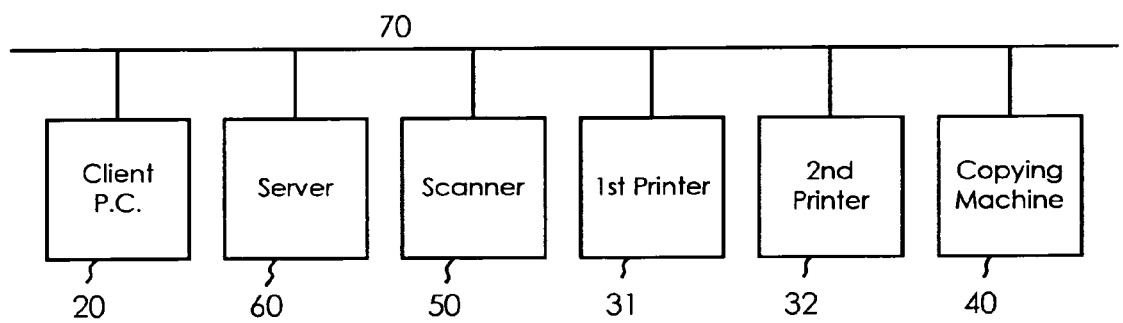
FIG. 1 is a drawing showing the basic construction of an image output system.

FIG. 1 shows the basic construction of an image output system. In the image output system 10, client personal computers 20 that create print data to be printed, first and second color printers 31 and 32 that print out print data, a digital color copying machine 40 that reads the original document and prints it out, a scanner 50 and a server 60 are connected to each other by means of the network 70. In the server 60 are registered the client personal computers 20, printers 31 and 32, copying machine 40 and scanner 50 connected to the network 70, and the server 60 controls the operation and status of these devices at all times. The number of printers and copying machines connected to the network 70 is not limited to the number shown in the example of FIG. 1.

The client personal computer 20 has a printer driver and a supplemental memory device. The printer driver creates print job data based on the document prepared on the client personal computer 20 using a document creation application, etc. Print job data includes the control information necessary for printing. The control information includes such parameters as one-sided printing or two-sided printing, the number of copies to be printed and the paper supply tray to be used, and is set by the printer driver.

The copying machine 40 has a scanner that reads the image, an image processing unit, a printing unit, an image transfer unit, a memory and a controller. The copying machine 40 can perform copying of an original document on a stand-alone basis, while part of its operation is controlled by the server 60 as well, such that the copying machine 60 can perform printing of print job data created on a client personal computer 20. In the event of a problem that disables printing, such as a failure of the printing unit, a paper jam, or a shortage of recording paper, the image transfer unit transfers the print data for the remainder of the original document and control information to the server 60. The control information comprises such parameters as two-sided printing or one-sided printing, the number of copies to be printed and the paper supply tray to be used.

The scanner 50, in addition to reading regular original documents, reads a color chart (ANSI IT8, for example), the chromaticity of which is measured in advance, in order to prepare color conversion data described below.

The server 60 controls printing in the network 70. Print commands from any client personal computer 20 are executed through the server 60. For example, if a problem occurs in the first printer 31 that is performing printing, the server 60 transfers all of the job that has not been printed by the failed first printer 31 to the second printer 32 or to the copying machine 40. The second printer 32 or the copying machine 40 then perform substitute printing of the remainder of the job that has not been printed yet. If a problem occurs in the copying machine 40 that is performing printing, the server 60 transfers all of the job that has not been printed by the failed copying machine 40 to the printers 31 or 32 or to other copying machines not shown in the drawing. The first printer 31 or other printers then outputs all of the job that has not been printed by the failed output device.

Figure 2:
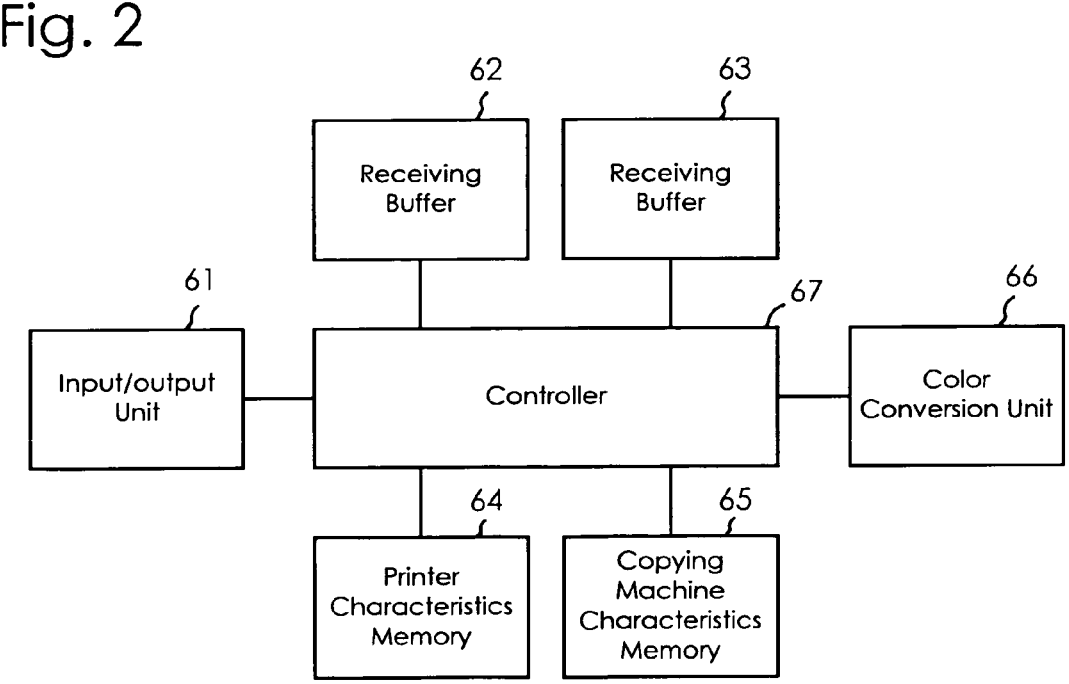
FIG. 2 is a block diagram showing the internal construction of a server.

FIG. 2 is a block diagram showing the internal construction of the server 60. The server 60 has an input/output unit 61, a receiving buffer 62, a bitmap memory 63, a printer characteristics memory 64, a copying machine characteristics memory 65, a color conversion unit 66, and a controller 67. The server 60 is connected to such devices as the client personal computers 20 on the network 70 via the input/output unit 61. The receiving buffer 62 stores print job data from the client personal computers 20 or the failed copying machine 40. The controller 67 stores a program to interpret the print job data input to the receiving buffer 62 and convert it into bitmap image data. The created bitmap image data is stored in the bitmap memory 63.

The printer characteristics memory 64 stores the printer color information regarding all printers 31 and 32 that are controlled by the server 60. The copying machine characteristics memory 65 stores the copying machine color information regarding all copying machines 40 that are controlled by the server 60. The printer color information is formatted into a table such that the color system that is dependent on the printers 31 or 32 corresponds to the color system that is not dependent on any device. This information is formatted into a table so that they correspond to each other. The copying machine color information comprises a color system that is dependent on the copying machine 40 and a color system that is not dependent on the device, which are formatted into a table so that they correspond to each other. The printer color information and the copying machine color information are generally used in a color management system (CMS). The color conversion unit 66 converts the print data based on the printer color information or the copying machine color information when performing substitute output.

Figure 3:
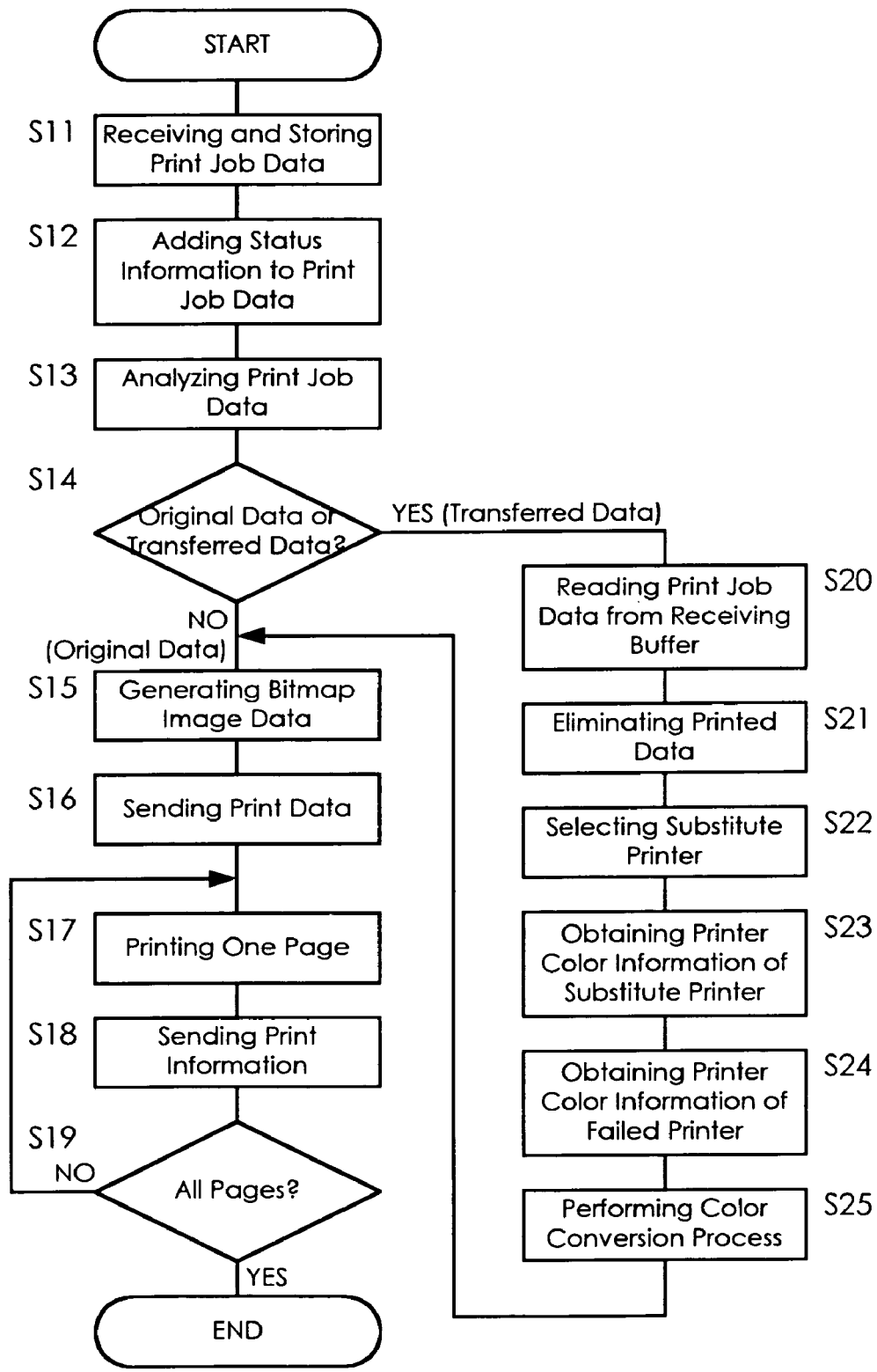
FIG. 3 is a flow chart showing the control sequence in the server during printing by a printer.

The sequence of the printing by the first printer 31 will now be explained with reference to the flow chart of FIG. 3.

<Regular Routine>

The regular routine will first be explained. When a print command is issued from a client personal computer 20, the controller 67 of the server 60 receives print job data from the client personal computer 20, and stores it in the receiving buffer 62 (S11). The controller 67 adds to the print job data the status information that indicates that the data is originally received data (S12). Specifically, it adds a '0' code, which indicates the normal routine.

The controller 67 then analyzes the print job data stored in the receiving buffer 62 (S13). The controller 67 determines whether or not the data is original data or transferred data based on the status information (S14). Here, because the status information is '0', the controller 67 performs the normal print routine (NO in S14).

The controller 67 analyzes the print job data, and develops and converts the RGB multi-gradation data into YMCK multi-gradation bitmap image data representing each ink color, i.e., yellow, magenta, cyan and black (S15). The bitmap image data is stored in the bitmap memory 63. The controller 67 sends the print data to the first printer 31, which is designated (S16). The print data includes the bitmap image data and a control sequence based on the control information. The first printer 31 receives the print data from the server 60, executes the print command in accordance with the control sequence, and prints out the print data for one page (S17).

The controller 67 monitors the status of the first printer 31 at all times from the time when the print data is sent. The first printer 31 notifies the server 60 of the print information each time printing is completed for one page, for example. For example, when printing for one page is completed normally, the first printer 31 returns '0', for example, as the print information, to the server 60 (S18). The controller 67 receives print information for each page, and counts the number of pages that have been printed (S17 through S19).

Where no problem occurs in the first printer 31 and printing of all pages is completed normally, the controller 67 counts the number of pages printed, which matches the number of pages to be printed out (S17 through S19). At this point, the controller 67 determines that one print job has been completed normally (YES in S19), and ends the printing operation.

The print job data in the receiving buffer 62 is retained until it is determined that the printing has been completed normally (YES in S19). The reason for this is that when a problem occurs in the first printer 31, prescribed data based on the retained print data is re-sent to the second printer 32 or to the copying machine 40.

<Routine Executed when a Problem Occurs>

The routine executed when a problem occurs will now be explained.

Suppose a problem that disables printing has occurred in the first printer 31 after printing of the mth page was completed.

The controller 67 receives the print information '0', which indicates that the printing was completed normally, up to the mth page, and receives the print information '1', which indicates that a problem occurred, regarding the mth+1 page. When it receives the print information '1', the controller 67 recognizes that printing is disabled for the mth+1 page onward in the first printer 31. The controller 67 then determines that re-sent data is needed in order to have another printer to execute the print job for the mth+1 page onward (YES in S14).

The controller 67 reads the entire print job data retained in the receiving buffer 62 and interprets it (S20). The controller 67 eliminates the data up to the mth page, which has already been printed, and creates print job data for the mth+1 page onward (S21). At this stage, the data is not bitmap image data that is actually printed out. The controller 67 then selects the second printer 32, which is designated beforehand, as the substitute printer (S22). Where a substitute printer is not pre-designated, the controller 67 automatically selects a printer or copying machine to perform substitute printing based on the state of use of the second printer 32 and the copying machine 40.

The controller 67 then advances to the routine to create bitmap data that accommodates the second printer 32. However, the color characteristics of the printed images greatly varies between the printer 31 and the printer 32 based on the differences in the manufacturer, model and the output method of the print engine. Consequently, regarding an original document comprising continuous pages of images, if printing is performed up to the mth page using the first printer 31, while the mth+1 page and subsequent pages are printed using the second printer 32, which is the substitute printer, the image color characteristics change significantly in the middle of the set, leading to poor appearance. Therefore, in this embodiment, in order to match the image characteristics from the second printer 32 with the image characteristics from the failed first printer 31 to the extent possible, the print data is converted by means of the color conversion unit 66.

Figures 4, 5:
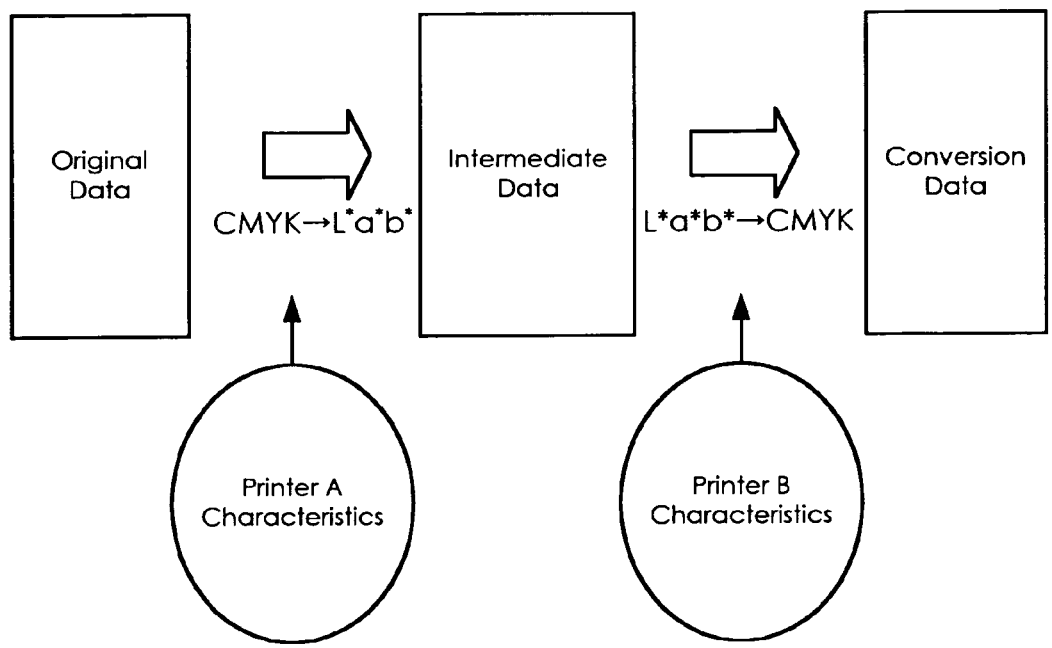
FIG. 4 is a simplified drawing showing the color conversion method.
FIG. 5 is a drawing showing one example of printer color information formatted into a table.

The conversion of print data will be explained with reference to FIGS. 4 and 5. FIG. 4 is a drawing to explain the color conversion method, and FIG. 5 shows one example of the printer color information presented in a table format.

First, the color conversion unit 66 reads from the printer characteristics memory 64 the printer color information for the second printer 32, to which the data is transferred (S23), and reads the printer color information for the failed first printer 31 (S24). With reference to FIG. 4, the printer color information for the second printer 32 is indicated as 'printer B characteristics' while the printer color information for the failed first printer 31 is indicated as 'printer A characteristics'. As shown in FIG. 5, the printer color information is presented in the format of a color conversion table. A color conversion table matches the color system that is dependent on the printers 31 or 32, such as the CMYK color system, with the $L^*a^*b^*$ color space of the CIE color system, for example, which is not dependent on any device. Using this color conversion table, print data may be matched to the $L^*a^*b^*$ color space. The creation of color conversion data using a color conversion table will be explained below.

The data for each pixel for the first printer 31 is extracted. From the color conversion table for the first printer 31, the color that the extracted data will represent in the $L^*a^*b^*$ color space can been seen. The color conversion table for the second printer 32 is then read. From this conversion table, the data that should be sent in order to achieve the same $L^*a^*b^*$ color space is sought and determined.

For example, suppose that when print data (Y, M, C, K)=(50, 50, 50, 50) is output by the first printer 31, color represented by $(L^*, a^*, b^*)$=(10, 9, 11, 15) is printed, and that on the other hand, the print data that produces the color closest to $(L^*, a^*, b^*)$=(10, 9, 11, 15) in the second printer 32 was sought and determined to be (Y, M, C, K)=(50, 48, 50, 52). In this case, the print data to be transferred to the second printer 32 is determined to be (Y, M, C, K)=(50, 48, 50, 52). This color conversion routine is performed for all of the pixels of the image, and print data to be transferred is created (S25).

The controller 67 interprets the color-converted print data, and creates bitmap image data (S15). The bitmap image data is stored in the bitmap memory 63.

The controller 67 sends the control sequence to the second printer 32 together with the bitmap image data (S16). The second printer 32 receives the print data from the server 60, executes the command in accordance with the control sequence, and prints out the print data for the mth+1 page onward (S17 through S19). The controller 67 monitors the status of the second printer 32 based on the print information transmitted by the second printer 32 until the printing is completed.

As described above, even if a problem occurs in the first printer 31, printing is continued by the second printer 32 without the data having to be re-sent from the client personal computer 20, and therefore the time required for printing is reduced. In addition, because only the pages that were not printed are output by the second printer 32, paper resources are not wasted. Moreover, because the print data is converted during the substitute printing, the color characteristics of the color images printed by the first printer 31 can be made to match those of the color images printed by the second printer 32. Consequently, a good appearance is maintained even if substitute printing is performed.

The color conversion data for the color conversion table is created in the following manner. First, a color chart, the chromaticity of which is measured in advance, such as ANSI IT8, is read by the scanner 50. The color chart that was thus read and obtained is printed out by the printers 31 and 32 and the copying machine 40. The printed color charts are then read by the scanner 50. Color conversion data is created based on the difference between the color chart data obtained by reading the original color chart and the color chart data obtained by reading the printed color chart. The created color conversion data is saved in the printer characteristics memory 64 or the copying machine characteristics memory 65 as a color conversion table. The color conversion table is updated when a printer or copying machine is connected to the network 70 and at prescribed intervals based on the aging of the device.

Figure 6:
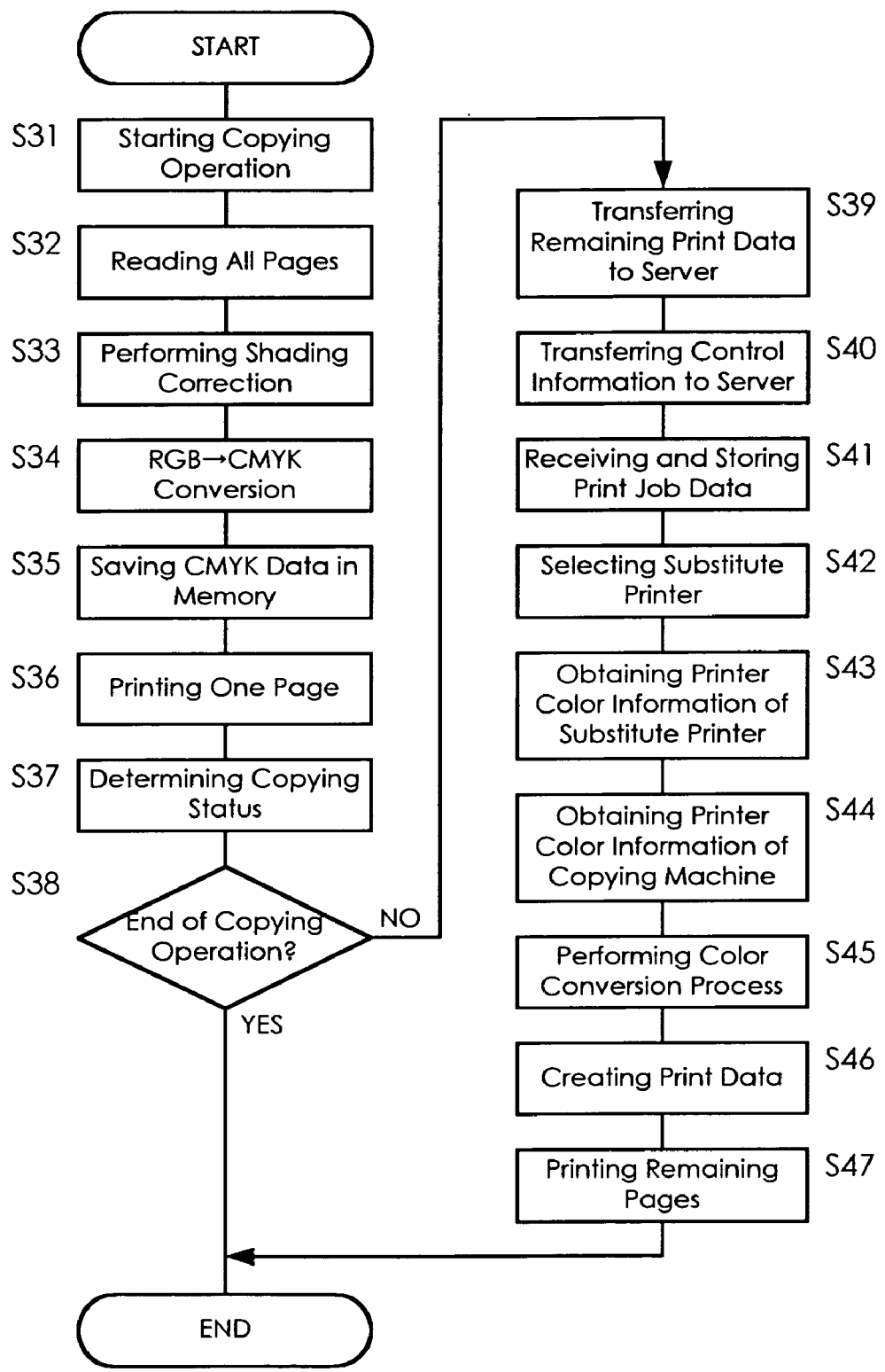
FIG. 6 is a flow chart showing the sequence during printing by a copying machine.

The sequence of the printing by the digital color copying machine 40 will now be explained with reference to the flow chart of FIG. 6.

<Normal Routine>

The normal routine will first be explained. When the user begins copying (S31), the pages of the original document placed in the original document conveyer 110 are sequentially conveyed. The scanner of the copying machine 40 sequentially scans the pages thus conveyed, and reads all of the pages of the original document (S32). The image processing unit performs A/D conversion of the print data read by the scanner, and creates RGB three-color data. The image processing unit performs shading correction to the RGB three-color data, in which corrections are made for the scanner characteristics, etc., and converts the RGB data into RGB digital data (S33). The image processing unit performs color conversion of the RGB digital data and converts it into CMYK data, representing the ink colors (S34). The data, which has undergone color conversion into CMYK data, is saved in the memory regarding all of the pages (S35).

The controller of the copying machine then converts the CMYK data saved in the memory into CMYK bitmap data to be used for printing, and prints out each page (S36). The controller monitors and determines its own copying status at all times (S37). The copying status is updated each time printing is completed normally and one sheet of paper is ejected. When it determines that all of the pages have been printed out normally (YES in S38), the controller ends the copying operation.

<Routine Executed when a Problem Occurs>

The routine that is executed when a print failure occurs in the copying machine 40 will now be explained. When a failure occurs, the copying machine 40 shifts to the operation in which the remainder of the pages to be printed, which are saved in the memory, is printed out by the printers 31 or 32 or by other copying machines not shown in the drawings. The image transfer unit extracts the remaining print data (the CMYK data before bitmap conversion), and transfers it to the server 60 (S39). The image transfer unit also transfers the control information to the server 60 (S40).

The controller 67 of the server 60 receives the print job data from the copying machine 40, and stores it in the receiving buffer 62 (S41). The controller 67 selects the second printer 32, which is designated beforehand, as the substitute printer (S42).

The controller 67 then analyzes the print job data, and develops and converts the CMYK multi-gradation data into CMYK multi-gradation bitmap image data representing each color of print ink, yellow, magenta, cyan and black. The bitmap image data is stored in the bitmap memory 63. When creating bitmap image data, the print data is converted by the color conversion unit 66 in order to have the image characteristics of the second printer 32 match the image characteristics by the failed copying machine 40 to the extent possible.

The conversion of the print data is performed in the same manner as that explained above. The color conversion unit 66 reads the printer color information for the second printer 32, which is the destination of the data transfer, from the printer characteristics memory 64 (S43), and reads the copying machine color information for the failed copying machine 40 from the copying machine characteristics memory 65 (S44). The copying machine color information is also formatted into a color conversion table as in the case of the printer color information shown in FIG. 5. The color conversion unit 66 performs color conversion for all of the pixels of the image using this color conversion table to create print data to be transferred (S45, S46).

The created bitmap image data is stored in the bitmap memory 63. The controller 67 sends the control sequence to the second printer 32 together with the bitmap image data. The second printer 32 receives the print data from the server 60, executes the print command in accordance with the control sequence, and prints out the remaining pages (S47). The controller 67 monitors the status of the second printer 32 until printing is completed based on the print information transmitted from the second printer 32.

As described above, even if a problem occurs in the copying machine 40, printing is continued by the second printer 32 without the original document having to be read again, and therefore the time required for printing is reduced and paper resources are conserved. In addition, even if only one copying machine 40 is available, the remaining printing may be performed by the printers 31 or 32 connected to the network 70. Moreover, because the print data is converted during the substitute printing, the color characteristics of the color images printed by the copying machine 40 can be made to match those of the color images printed by the second printer 32. Consequently, a good appearance is maintained.

In the embodiment described above, the print data is converted so that consistent color characteristics is maintained when a substitute device is used to print out color images, but the present invention is not limited to cases in which color images are printed. In a printer or copying machine that prints out monochrome images, a darkness curve ($\gamma$ characteristic) that corresponds to the print data should be saved, and the data should be converted so that the post-conversion data has the same curve. Consequently, the gradation characteristics of the monochrome images may be maintained, and the quality of the images printed out before the occurrence of the problem may be made to match the quality of the images printed using the substitute device.

In addition, a case in which the CMYK data undergoes color conversion was shown with regard to the digital copying machine 40, but the present invention is not limited to this case. For example, the RGB data after A/D conversion may undergo color conversion. The color conversion table in this case matches the RGB color system that is dependent on the copying machine 40 with the L*a*b* color space of the CIE color system, for example, which is not dependent on the device.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A printer control device which controls multiple printers connected to a network circuit, said printer control device comprising:
    a detector for detecting a problem in any of the printers;
    a selection controller for selecting, when a problem is detected by the detector, another normally functioning printer to substitute for the printer in which the problem is detected by said detector; and
    a substitution controller for correcting print data expressed in a device dependent color system, that was to have been printed out by the printer in which the problem is detected by said detector, based on a color information of the printer in which the problem is detected by the detector and a color information of the selected substitute printer, to ensure that image quality of the images printed by the selected substitute printer is the same as that of the images printed by the printer in which the problem is detected, and for outputting the corrected print data expressed in the device dependent color system to the selected substitute printer, the color information of the printer in which the problem is detected and the selected substitute printer each includes color conversion information for the respective printer between the device dependent color system and a device independent color space.

2. A printer control device as claimed in claim 1, wherein the print data include color print data that indicate a color image, and said substitution controller performs correction so that a color characteristic of the color image printed by the printer in which the problem is detected is the same as that of the color image printed by the selected substitute printer.

3. A printer control device as claimed in claim 1, wherein the print data include middletone print data that indicate a middletone image, and the substitution controller performs correction so that a gradation characteristic of the middletone image printed by the printer in which the problem is detected is the same as the gradation characteristic of the middletone image printed by the selected substitute printer.

4. A printer control device as claimed in claim 1, wherein when said detector detects a problem in the printer performing a print job, said substitution controller outputs to the selected substitute printer the print data for remaining pages not printed by the printer in which the problem is detected.

5. A printer control device as claimed in claim 1, wherein said multiple printers include a copying machine.

6. A printer control method for controlling multiple printers connected to a network circuit, said printer control method comprising steps of:
    detecting a problem in any of the printers;
    selecting, when a problem is detected in said detecting step, another normally functioning printer to substitute for the printer in which the problem is detected in said detecting step; and
    correcting print data expressed in a device dependent color system, that was to have been printed out by the printer in which the problem is detected in said detecting step, based on a color information of the printer in which the problem is detected in said detecting step and a color information of the selected substitute printer, to ensure that image quality of the images printed by the selected substitute printer is the same as that of the images printed by the printer in which the problem is detected, and for outputting the corrected print data expressed in the device dependent color system to the selected substitute printer, the color information of the printer in which the problem is detected and the selected substitute printer each includes color conversion information for the respective printer between the device dependent color system and a device independent color space.

7. A printer control method as claimed in claim 6, wherein the print data include color print data that indicate a color image, and the correction is performed in said correcting step so that a color characteristic of the color image printed by the printer in which the problem is detected is the same as that of the color image printed by the selected substitute printer.

8. A printer control method as claimed in claim 6, wherein the print data include middletone print data that indicate a middletone image, and the correction is performed in said correcting step so that a gradation characteristic of the middletone image printed by the printer in which the problem is detected is the same as the gradation characteristic of the middletone image printed by the selected substitute printer.

9. A printer control method as claimed in claim 6, wherein when a problem is detected in the printer performing a print job in said detecting step, said correcting step outputs to the selected substitute printer the print data for remaining pages not printed by the printer in which the problem is detected.

10. A printer control method as claimed in claim 6, wherein said multiple printers include a copying machine.

11. A computer readable medium including computer executable code capable of being run on a computer for controlling multiple printers connected to a network circuit, said computer readable medium comprising computer code for:
    detecting a problem in any of the printers;
    selecting, when a problem is detected by said detecting computer code, another normally functioning printer to substitute for the printer in which the problem is detected by said detecting computer code; and
    correcting print data expressed in a device dependent color system, that was to have been printed out by the printer in which the problem is detected by said detecting computer code, based on a color information of the printer in which the problem is detected by the detecting computer code and a color information of the selected substitute printer, to ensure that image quality of the images printed by the selected substitute printer is the same as that of the images printed by the printer in which the problem is detected, and for outputting the corrected print data expressed in the device dependent color system to the selected substitute printer, the color information of the printer in which the problem is detected and the selected substitute printer each includes color conversion information for the respective printer between the device dependent color system and a device independent color space.

12. A computer readable medium as claimed in claim 11, wherein the print data include color print data that indicate a color image, and said computer code for correcting print data performs the correction so that a color characteristic of the color image printed by the printer in which the problem is detected is the same as that of the color image printed by the selected substitute printer.

13. A computer readable medium as claimed in claim 12, wherein the print data includes middletone print data that indicate a middletone image, and said computer code for correcting print data performs the correction so that a gradation characteristic of the middletone image printed by the printer in which the problem is detected is the same as the gradation characteristic of the middletone image printed by the selected substitute printer.

14. A computer readable medium as claimed in claim 11, wherein when said computer code for detecting a problem detects a problem in the printer performing a print, said computer code for correcting print data outputs to the selected substitute printer the print data for remaining pages not printed by the printer in which the problem is detected.

15. A computer readable medium as claimed in claim 11, wherein said multiple printers include a copying machine.

16. A printing system comprising:
  a first printer, which is connected to a network, for printing print data;
  a second printer, which is also connected to the network to which said first printer is connected, for printing print data;
  a detector for detecting a problem in any one of said first and second printers;
  a controller for selecting, when said detector detects a problem in said first printer, said second printer as a substitute printer, for correcting print data expressed in a device dependent color system that was to have been printed out by said first printer, based on a color information of the first printer in which the problem is detected by the detector and a color information of the second printer, to ensure that image quality of the images printed by said second printer is the same as that of the images printed by said first printer, and for outputting the corrected print data expressed in the device dependent color system to said second printer, the color information of the printer in which the problem is detected and the selected substitute printer each includes color conversion information for the respective printer between the device dependent color system and a device independent color space.

17. A printing system as claimed in claim 16, wherein the print data includes color print data that indicates a color image, and said controller performs correction so that a color characteristic of the color image printed by said first printer in which the problem is detected is the same as that of the color image printed by said second printer.

18. A printing system as claimed in claim 16, wherein the print data include middletone print data that indicate a middletone image, and the controller performs correction so that a gradation characteristic of the middletone image printed by the first printer in which the problem is detected is the same as the gradation characteristic of the middletone image printed by the second printer.

19. A printing system as claimed in claim 16, wherein when said detector detects a problem in the first printer performing a print job, said controller outputs to the second printer the print data for remaining pages not printed by the first printer in which the problem is detected.

20. A printing system as claimed in claim 16, wherein at least one of said first and second printers is a copying machine.

21. A printer control device as claimed in claim 1, wherein image quality includes at least one of a color characteristic and a gradation characteristic.

22. A printer control method as claimed in claim 6, wherein image quality includes at least one of a color characteristic and a gradation characteristic.

23. A computer readable medium as claimed in claim 11, wherein image quality includes at least one of a color characteristic and a gradation characteristic.

24. A printing system as claimed in claim 16, wherein image quality includes at least one of a color characteristic and a gradation characteristic.

25. A printer control method for controlling a first printer having a first reproduction characteristic and a second printer having a second reproduction characteristic, the first reproduction characteristic including color conversion information for the first printer between a device dependent color system and a device independent color space, the second reproduction characteristic including color conversion information for the second printer between the device dependent color system and the device independent color space, said first and second printers connected to a network circuit, said printer control method comprising steps of:
  assigning, when the first printer malfunctions, the second printer to substitute for the first printer;
  correcting the print data expressed in the device dependent color system that was to have been printed out by the first printer and was processed based on the first reproduction characteristic for printing by the first printer, based on both the first reproduction characteristic and the second reproduction characteristic, so that an image quality due to the first reproduction characteristic is substantially the same as an image quality due to the second reproduction characteristic; and
  outputting the corrected print data expressed in the device dependent color system to the second printer.

26. A printer control method as claimed in claim 25, wherein image quality includes at least one of a color characteristic and a gradation characteristic.

27. A printer control method as claimed in claim 25, wherein the first and second reproduction characteristics each include at least one of a color characteristic and a gradation characteristic.

* * * * *